United States Patent
Duperon et al.

(10) Patent No.: US 10,968,617 B2
(45) Date of Patent: Apr. 6, 2021

(54) LIFT STATION MAINTENANCE DEVICE

(71) Applicants: Terry Duperon, Saginaw, MI (US); Steven Dill, Saginaw, MI (US)

(72) Inventors: Terry Duperon, Saginaw, MI (US); Steven Dill, Saginaw, MI (US)

(*) Notice: Subject to any disclaimer, the term of this patent is extended or adjusted under 35 U.S.C. 154(b) by 128 days.

(21) Appl. No.: 16/430,624

(22) Filed: Jun. 4, 2019

(65) Prior Publication Data

US 2020/0385974 A1 Dec. 10, 2020

(51) Int. Cl.
*E03F 5/14* (2006.01)
*B01D 29/44* (2006.01)

(52) U.S. Cl.
CPC .............. *E03F 5/14* (2013.01); *B01D 29/445* (2013.01)

(58) Field of Classification Search
None
See application file for complete search history.

(56) References Cited

U.S. PATENT DOCUMENTS

| | | | | |
|---|---|---|---|---|
| 2,119,162 A | * | 5/1938 | Hartner | B30B 9/16 100/146 |
| 2,145,882 A | * | 2/1939 | Lathrop | B65G 33/04 198/530 |
| 2,173,414 A | * | 9/1939 | Fulton | F23K 3/00 198/530 |
| 2,458,068 A | * | 1/1949 | Fuller | B29C 48/38 100/104 |
| 2,567,219 A | * | 9/1951 | Lesniak | B30B 11/243 100/146 |
| 2,693,873 A | * | 11/1954 | Martin | B65G 33/14 198/670 |
| 2,951,693 A | * | 9/1960 | Carothers | E21C 27/22 299/55 |
| 3,064,908 A | * | 11/1962 | Sixten | D21D 5/06 241/252 |
| 3,170,566 A | * | 2/1965 | Zimmermann | B01F 7/085 198/625 |
| 3,215,355 A | * | 11/1965 | Shouvlin | D21D 1/30 241/247 |
| 3,247,864 A | * | 4/1966 | Conery | E03F 5/22 417/7 |
| 3,375,788 A | * | 4/1968 | Solas | F04D 29/605 137/364 |
| 3,425,640 A | * | 2/1969 | Macholdt | B65G 53/48 241/236 |
| 3,457,989 A | * | 7/1969 | Nonnenmacher | B65G 45/005 165/87 |
| 3,460,466 A | * | 8/1969 | Adams | B30B 9/163 100/117 |
| 3,461,793 A | * | 8/1969 | Solberg | B30B 9/16 100/117 |
| 3,529,661 A | * | 9/1970 | Yousch | F28F 5/06 165/87 |
| 3,529,939 A | * | 9/1970 | Mason | A22C 17/00 422/273 |

(Continued)

*Primary Examiner* — Robert J Popovics

(57) ABSTRACT

A lift station maintenance device having as its essential features, a circular housing constructed from bars, interleaving self-centering augers for lifting flushable wipes through the system, spring snap options for retaining the bar in slots in top and base plates, and capability to remove large flushable wipes or equivalent materials from liquid sewage systems without clogging. Also disclosed is a lift station maintenance system.

6 Claims, 7 Drawing Sheets

(56) References Cited

U.S. PATENT DOCUMENTS

| | | | | |
|---|---|---|---|---|
| 3,549,000 | A | * | 12/1970 | Christian ............... B65G 33/00 198/659 |
| 3,580,389 | A | * | 5/1971 | Nonnenmacher ..... B29C 48/252 198/625 |
| 3,637,069 | A | * | 1/1972 | Christian ............ B01F 7/00433 198/676 |
| 3,865,727 | A | * | 2/1975 | Broling .............. B01D 29/6476 210/162 |
| 4,078,653 | A | * | 3/1978 | Suter .................... F01C 21/102 198/625 |
| 4,393,983 | A | * | 7/1983 | Eriksson ................. D21D 1/38 100/146 |
| 4,446,094 | A | * | 5/1984 | Rossiter ................. B29B 7/484 264/349 |
| 4,594,153 | A | * | 6/1986 | Weis ........................ E03F 5/22 210/104 |
| 4,634,524 | A | * | 1/1987 | Huber .................. B01D 33/648 210/158 |
| 4,859,322 | A | * | 8/1989 | Huber .................... B01D 29/54 210/162 |
| 4,871,449 | A | * | 10/1989 | Lott .................. B01D 21/0012 210/110 |
| 5,006,236 | A | * | 4/1991 | Croket .............. B01D 29/6476 210/162 |
| 5,078,865 | A | * | 1/1992 | Huber .................. B01D 29/035 210/162 |
| 5,526,740 | A | * | 6/1996 | Lee ..................... B01D 29/117 100/112 |
| 5,641,398 | A | * | 6/1997 | Huber ..................... E03F 5/14 210/158 |
| 5,770,094 | A | * | 6/1998 | Garton ............... B01D 29/6415 210/791 |
| 6,096,201 | A | * | 8/2000 | Bruke ................ B01D 21/0039 210/155 |
| 6,103,110 | A | * | 8/2000 | Frommann .......... B01D 29/118 210/159 |
| 6,550,376 | B2 | * | 4/2003 | Johnston ................ B30B 9/122 100/117 |
| 7,044,289 | B2 | * | 5/2006 | Madsen ................. A22C 11/08 198/663 |
| 7,332,081 | B2 | * | 2/2008 | Harms ................... B01D 33/21 210/331 |
| 7,344,637 | B2 | * | 3/2008 | Frommann ............... E03F 5/14 210/158 |
| 7,438,810 | B2 | * | 10/2008 | Lindl ....................... E03F 5/14 100/117 |
| 7,958,820 | B2 | * | 6/2011 | Duperon ................ B30B 9/121 100/117 |
| 8,017,021 | B1 | * | 9/2011 | Staples ............... B02C 18/0092 210/773 |
| 8,221,816 | B1 | * | 7/2012 | Leffelman ............. A01J 25/008 426/582 |
| 8,739,963 | B2 | * | 6/2014 | Nickerson .............. B65G 33/18 198/604 |
| 9,290,330 | B2 | * | 3/2016 | Nickerson .............. B65G 33/34 |
| 9,415,945 | B1 | * | 8/2016 | Whitney .............. B65G 33/265 |
| 9,469,962 | B1 | * | 10/2016 | LeBlanc ................. E02D 29/10 |
| 9,764,264 | B2 | * | 9/2017 | Peterson, II ........... C02F 1/004 |
| 9,908,067 | B2 | * | 3/2018 | Wright ............... B01D 21/2433 |
| 10,258,017 | B2 | * | 4/2019 | Nelles ................... B01F 15/068 |
| 10,634,166 | B2 | * | 4/2020 | Sabo ........................ E03F 5/22 |
| 10,711,801 | B2 | * | 7/2020 | Sabo ........................ F04D 13/08 |
| 2008/0028952 | A1 | * | 2/2008 | Duperon ................... B30B 9/16 100/106 |
| 2008/0105141 | A1 | * | 5/2008 | Duperon ................... B30B 9/18 100/106 |
| 2012/0073676 | A1 | * | 3/2012 | Frommann ............ B01D 33/11 137/315.01 |
| 2015/0296739 | A1 | * | 10/2015 | Nelles .................... B01F 7/082 426/511 |
| 2016/0288023 | A1 | * | 10/2016 | Wright .................... C02F 1/441 |
| 2018/0304324 | A1 | * | 10/2018 | Oude Grotebevelsborg ............... B07B 1/55 |
| 2019/0075822 | A1 | * | 3/2019 | Wenger ................. A23K 50/42 |

\* cited by examiner

LIFT STATION MAINTENANCE DEVICE

BACKGROUND OF THE INVENTION

So called "flushable wipes" are creating maintenance issues at small lift stations in conventional sewage systems. A simple screening device could save labor and parts. There are thousands of lift stations across the country which could benefit from such devices. Existing technologies are elaborate and expensive and require a lot of maintenance.

Prior devices discovered by the inventors herein consist of U.S. Pat. No. 6,103,110, which issued to Frommann, et al. on Aug. 15, 2000 in which there is described a screening apparatus for sewage wherein separating is the essence of the invention. The device requires bringing in raw sewage, separating it and conveying the result to a disposal.

U.S. Pat. No. 5,641,398, which issued to Huber, et al. on Jun. 24, 1997 deals with a device for removing floating and suspended debris from a liquid flow. The material is separated by a separator.

U.S. Pat. No. 4,634,524 issued Jan. 26, 1987 deals with a device for removing screened or sifted material from a liquid flowing in a gutter. The separation phase is described as being handled by a separator.

U.S. Pat. No. 7,438,810, which issued to Lindl, et al. on Oct. 21, 2008 deals with a sieve device which consists of a screened sieve for removing material from a liquid stream.

U.S. Pat. No. 7,344,637 which issued Mar. 18, 2008 to Frommann deals with an apparatus that removes fine material from wastewater. The device uses a mesh sieve for such separation.

U.S. Pat. No. 7,332,081 which issued Feb. 19, 2008 to Harms, et al deals with a filter device for clarification of contaminated liquids using mounting rods that are attached to and extend generally perpendicular from a carrying disk. The rods are spaced a certain distance apart for separation purposes. The mounting rods are mounted on a carrying disk. The ends of the filter modules circumscribe a cavity within the vessel having a longitudinal axis corresponding to the rotation axis of the carrying disk. The cavity is configured such that a cleaning fluid medium from within the cavity flows radially out from said cavity and between the filter elements to clean the filter elements.

U.S. Patent Publication 2016/0288023 deals with an apparatus and method for treatment of food process wastewater. A screen decanter is used in a tank for the separation. The screen has a porosity of about 50 micrometers. Also shown as FIG. 10, is a slitted panel for separation purposes.

U.S. Pat. No. 9,764,264 which issued Sep. 19, 2017 to Peterson, et al. deals with a ballast water treatment system in which there is a screen filter for separation.

None of the prior art devices or systems anticipate or make obvious the instant invention.

THE INVENTION

Thus, what is described in this specification in one embodiment is a lift station maintenance device. The lift station maintenance device comprises in combination a base plate having a plurality of slots in a top surface thereof, a top plate having a plurality of slots in a bottom surface, a plurality of bars in the slots forming a circular open housing.

In addition, there is a pair of dual interleaving augers contained within the circular open housing wherein the augers are self-centering. The augers have a lower end. The lower end of each auger is driveably connected to a motor.

In another embodiment, this invention deals with a lift station maintenance system, wherein the system comprises in combination a vertical housing having a lower port for sewage entry and contained within the vertical housing, a lift station maintenance device as set forth just above. It is contemplated within this invention to provide a lower port for sewage entry having an overflow escapement.

There is an elongated tube surmounting the device and an electrical power source for the submersible pump.

DETAILED DESCRIPTION OF THE DRAWINGS

Figure 1:
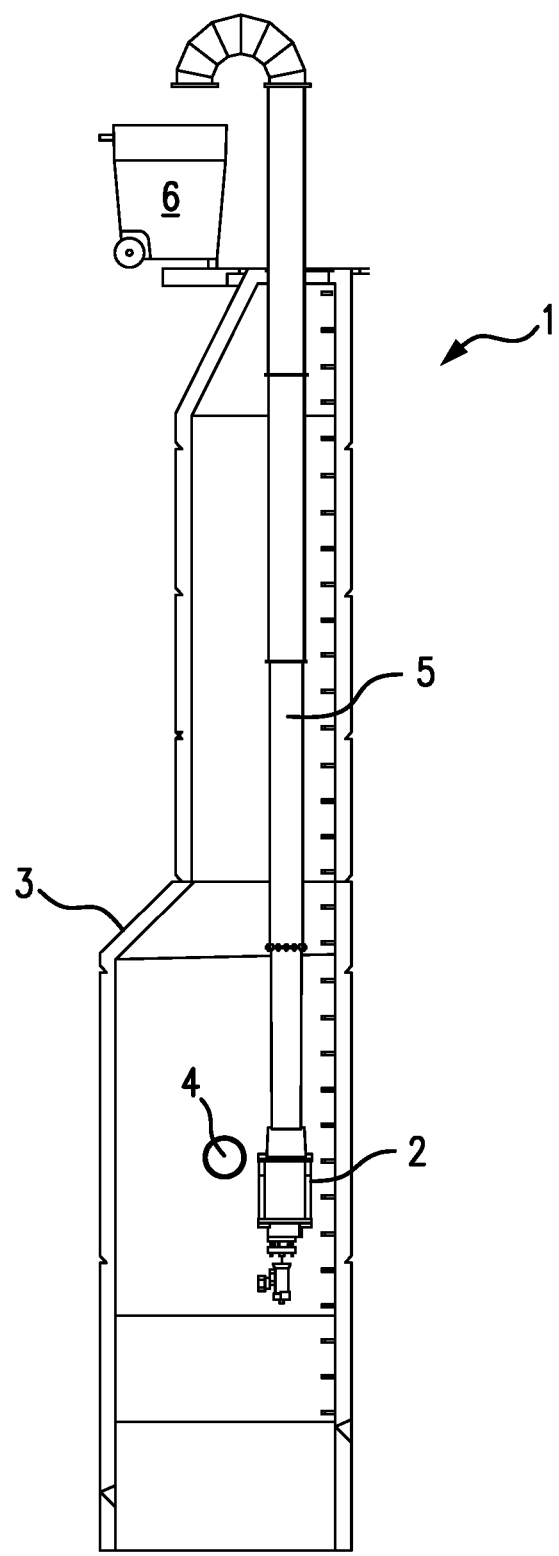
FIG. 1 is a full side view of a system of this invention.

Turning now to the drawings, there is shown in FIG. 1 a full assembly of a system 1 of this invention wherein there is also shown a lift station maintenance device 2 mounted inside a housing 3. Shown near the lift device 2 is an opening 4 for sewage to flow into the housing 3 where it contacts the lift device 2. The lift device 2 is surmounted by and connected to an elongated hollow tubing 5 which carries rough materials from the lift device to the topside and deposits them in the carriage 6.

Figure 2:
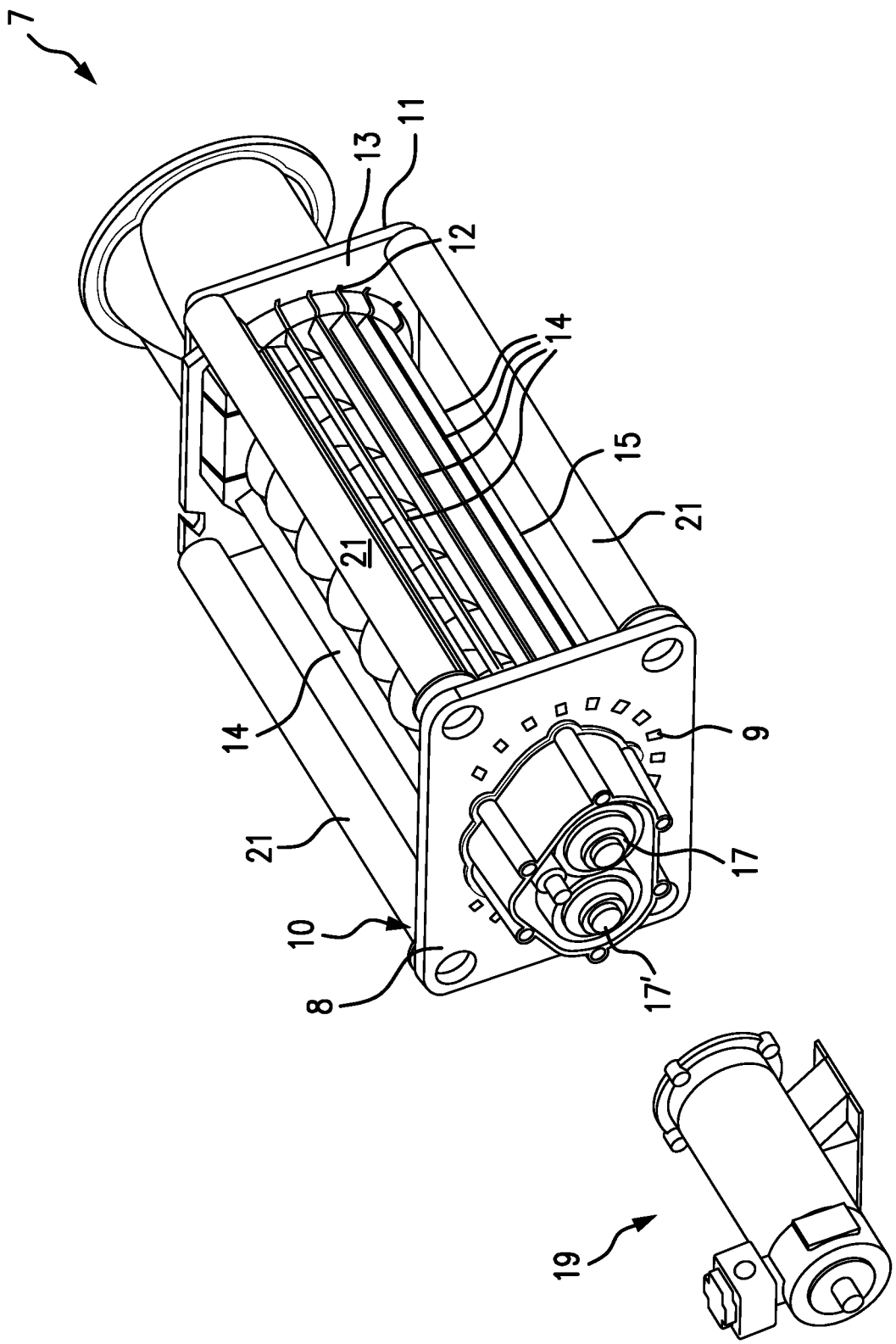
FIG. 2 is view in perspective of the device of this invention.
Figure 4:
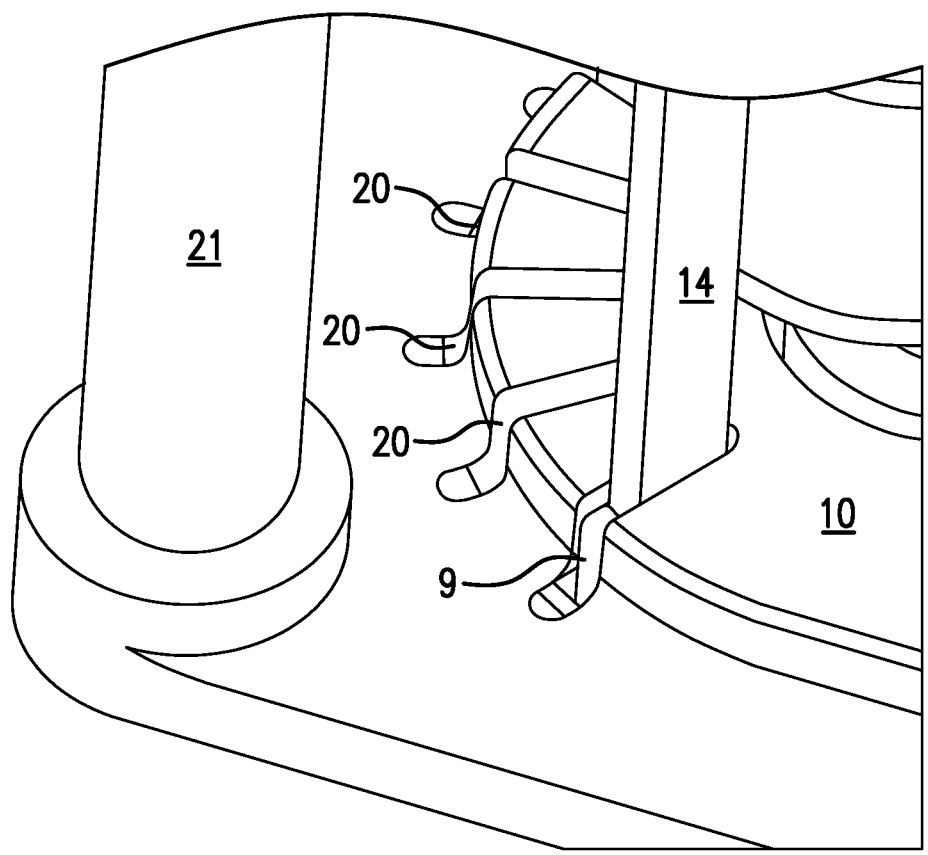
FIG. 4 is an enlarge view of a portion of the base plate.

Shown in FIG. 2 is a lift station maintenance device 7, said lift station maintenance device comprised of a base plate 8, having a plurality of slots 9 in a top surface 10 (FIG. 4). In addition, there is a top plate 11 having a plurality of slots 12 in a bottom surface 13.

There is a bar 14 inserted in each slot combination, that is, a single bar with one end in the top slot 12 and the opposite end in the reciprocal slot 9 to form a circular open housing 15 using a plurality of bars 14. The bars 14 can be free standing, or can be held in place by spring clips 20 as shown in FIG. 4. Using spring clips along with the bars in conjunction with self-centering augers, allows for floating bars, that can move against pressures of the flushable wipes against the augers discussed infra and thereby allow for the inclusion of large debris. The spring clips also allow for constant pressure of the augers against the bars in a scraping mode.

Figure 3:
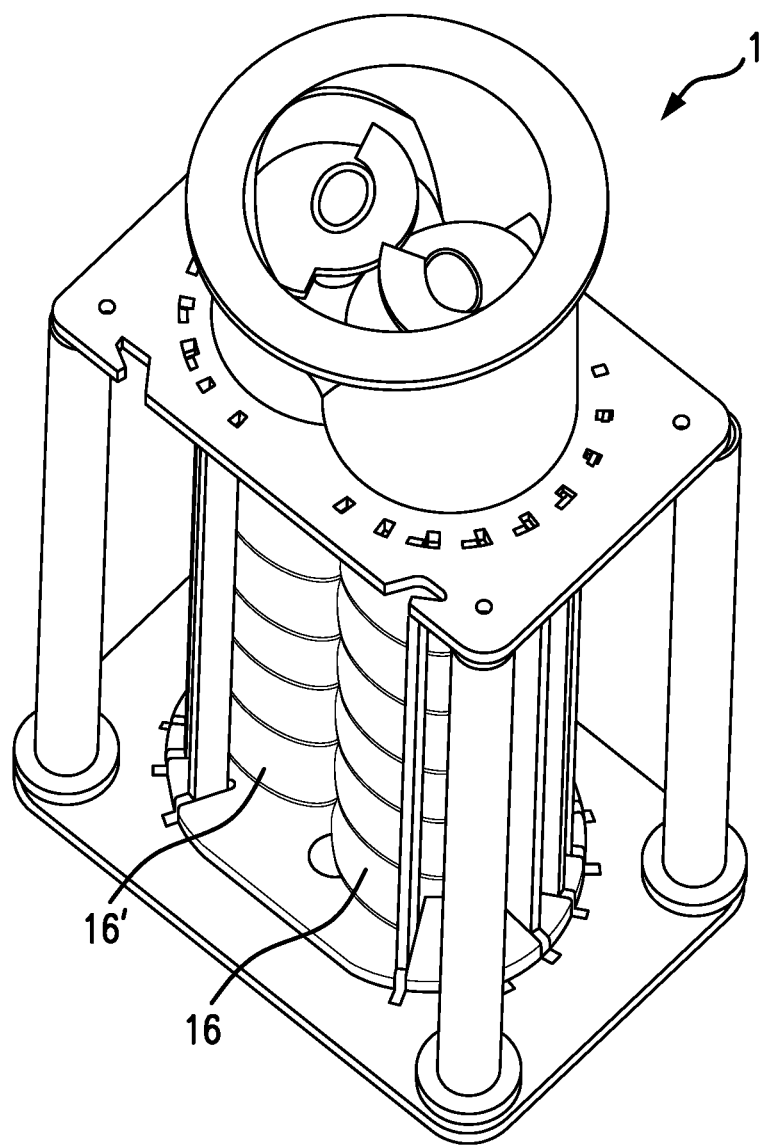
FIG. 3 is a top perspective view of the augers in the housing.
Figure 5:
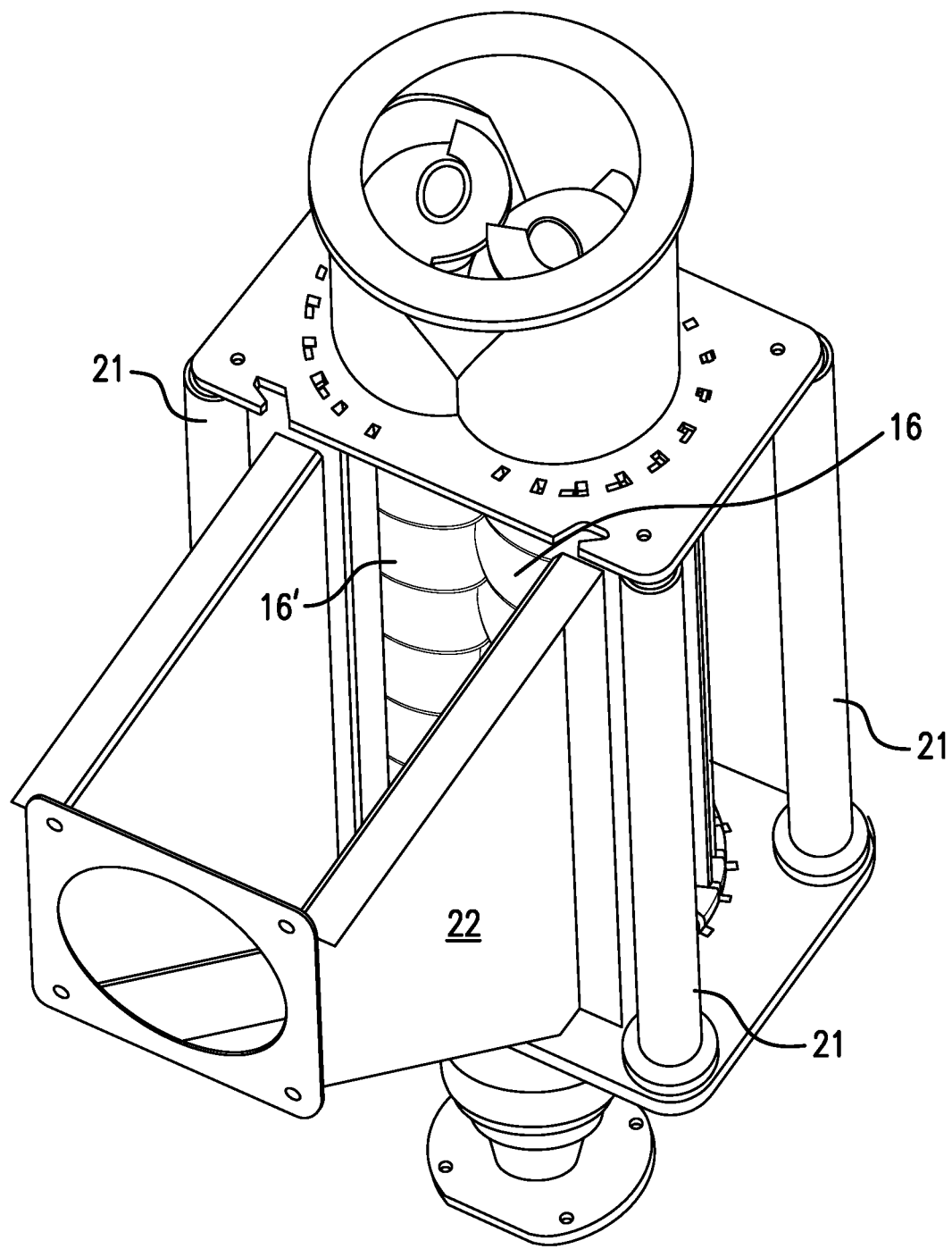
FIG. 5 is a top view in perspective of the device of this invention with an input port attached to a side.

The bars can be spaced any distance apart, but the inventors herein have found that inch or inch or 1 inch are satisfactory to allow good performance of the device 1. Contained within the circular open housing 15 is a pair of dual interleaving augers 16 and 16' (FIGS. 3 and 5). The augers 16 and 16' are self-centering and have lower ends 17 and 17' (FIG. 2).

Each auger lower end is connected to and driven by a motor 19. Electrical connections and switches for the motor 19 are not shown and any configuration and combination of switches and wiring that will control the motor 19 is acceptable.

Figure 7:
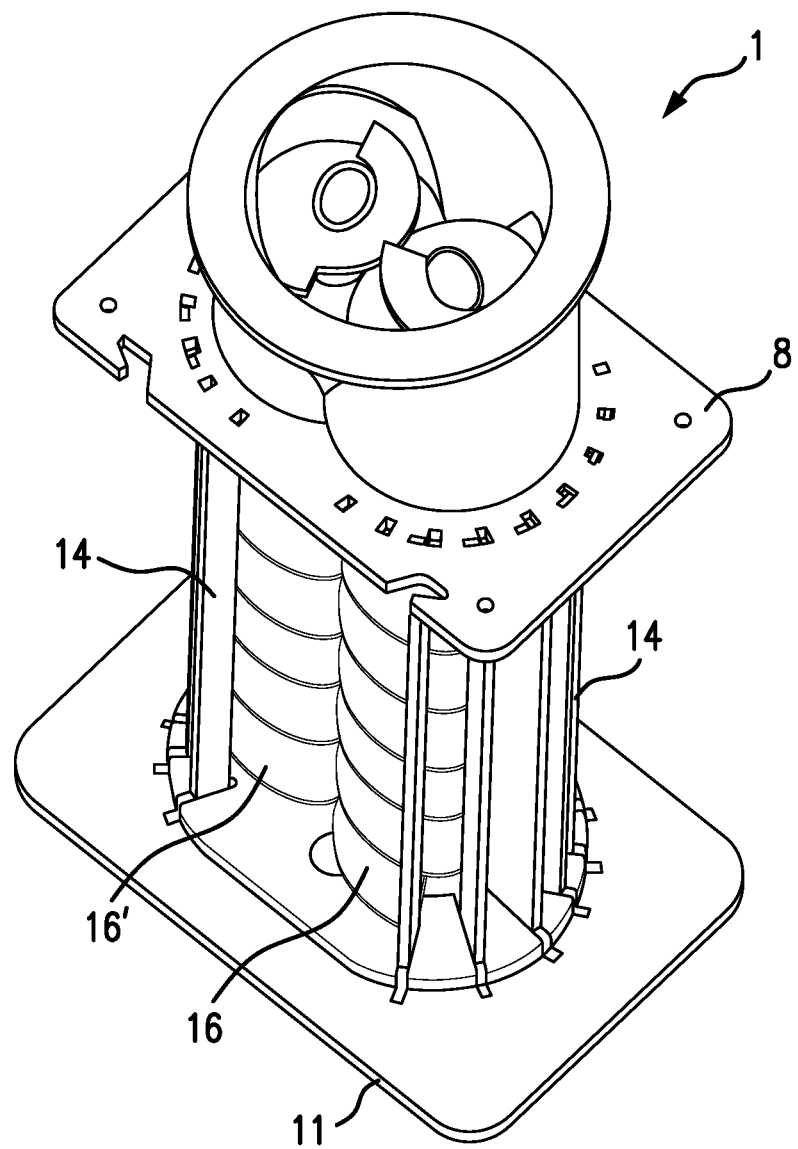
FIG. 7 is a device of this invention without the corner support rods.

Shown in FIGS. 2, 3, 4, and 5 are supports 21 that can be used to support the bottom plate 11 and the top plate 8. It is contemplated within the scope of this invention to provide a lift station maintenance device without supporting posts 21 (see FIG. 7). In the latter case, one would tend to provide support for the plates by careful positioning of the bars 14, or some other means.

FIG. 5 showing a front view in perspective of a lift station maintenance device of this invention containing an inlet flow device 22 attached to the lift station maintenance device 1. It should be noted that the inlet flow device 22 has an open top for overflow purposes. It is contemplated within the scope of this invention to provide an inlet flow device 22 that is readily disconnected from the lift station maintenance device 1.

Figure 6:
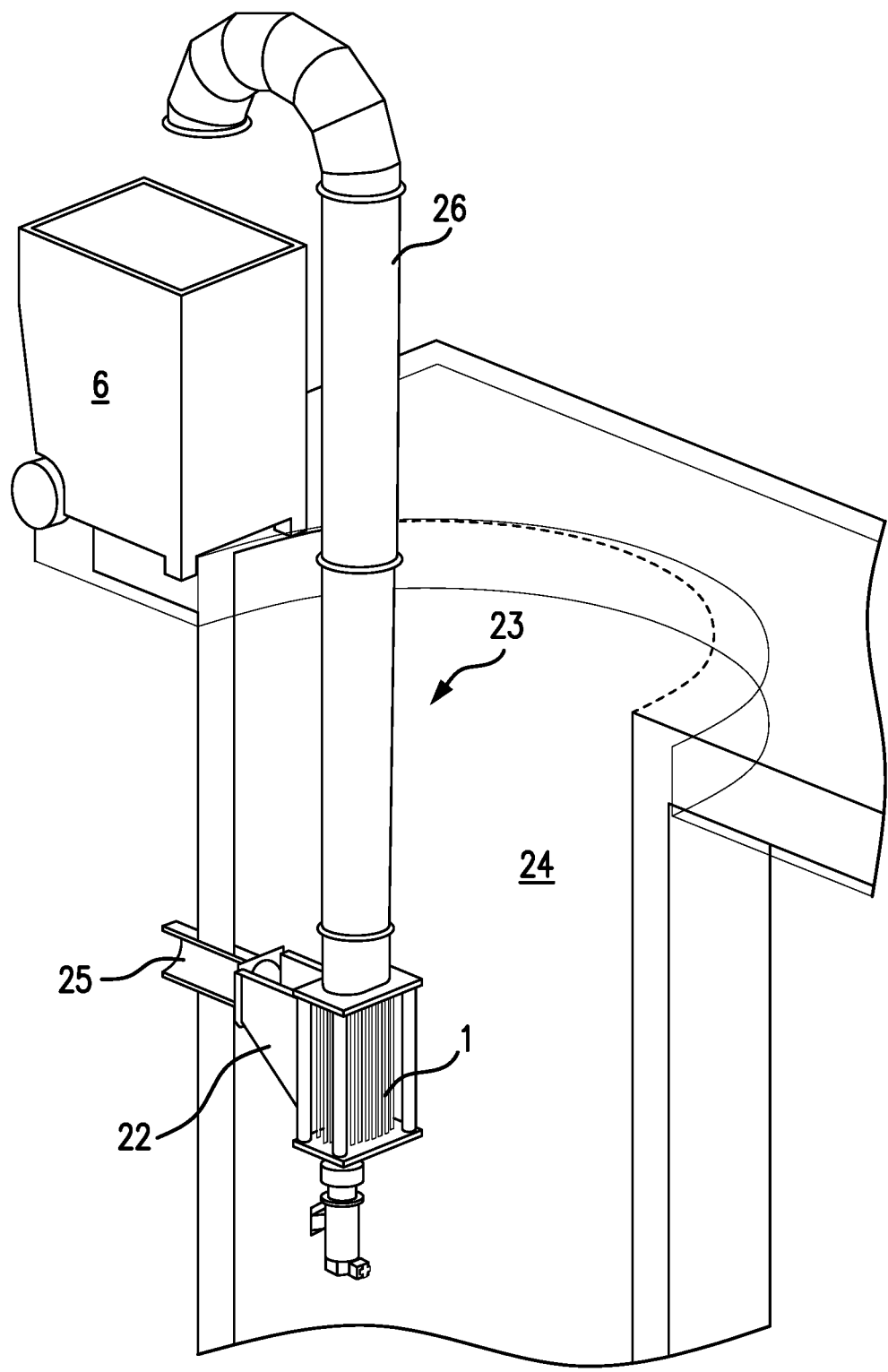
FIG. 6 is a view of a system showing the system in a lift station well.

Turning now to FIG. 6, there is shown an illustration of a lift station maintenance system 23 wherein the system 23 comprises a lift station maintenance device 1 as described Supra, immersed in a deep collection well 24. There is an elongated tube 26 surmounting the lift station maintenance device 1 that terminates above the surface of the deep collection well 24. Attached to the inlet flow device 22 is a tube 25 that brings raw sewage into the deep collection well 24. When debris is moved by the lift station maintenance device 1 to the surface, it is deposited in a carriage 6. Not shown is the electrical apparatus for the motor 19. The motor 19 may be submersible.

The device and system of this invention are configured to remove flushable wipes and the like from sewer systems prior to the flushable wipes arriving at a sewer processing facility. The device of the instant invention is not a screening device to remove all solids out of the liquid, but is instead configured to move the flushable wipes and other larger debris upward through the elongated tube 26 by action of the interleaving augers 16 and 16'. Because of the use of bars situated at a predetermined distance apart, as opposed to mesh screens, the lift station maintenance device 1 can remove the flushable wipes from the sewage and move the flushable wipes to the surface for collection.

The devices and systems of this invention are well-suited for neighborhood lift stations or for point of use uses such as convalescent homes, hospitals, industrial sites, and the like.

It should be noted that the device of this invention has many advantages over those devices that use screening for removal of debris from sewer liquid. The device of this invention is low maintenance owing to the self-centering action of the augers and the openness of the bar housing 15.

The use of the removable bars 14 allows for repair and refurbishment of the device 1. Further, the use of bars per se creates a non-clogging situation with the device 1.

The device of this invention is easy to install and the overflow feature on the inlet flow device allows continued reliability of the device.

What is claimed is:

1. A lift station maintenance device for removal of flushable wipes and other larger debris from sewage, said lift station maintenance device comprising in combination:
  A. a base plate;
  B. a top plate having a central opening extending therethrough;
  C. a plurality of uniformly space bars partially encircling said central opening defining a partially encircled cylindrical volume, each bar vertically extending from a slot in a top surface of said base plate to a slot in a bottom surface of said top plate, the non-encircled portion of said circular volume defining an inlet through which sewage may enter said cylindrical volume;
  D. a pair of dual interleaving augers contained within said cylindrical volume for urging debris up through said central opening, said augers being self-centering, said augers having a lower end; and
  E. each said auger lower end being driveably connected to a motor.

2. A lift station maintenance device as claimed in claim 1 wherein the top plate is supported by support members.

3. A lift station maintenance device as claimed in claim 1 wherein said bars are held against said augers and secured by spring clips in said slots.

4. A lift station maintenance device as claimed in claim 1 further comprising an inlet flow device attached to the lift station maintenance device for directing sewage through said inlet into said cylindrical volume.

5. A lift station maintenance device as claimed in claim 4 wherein said inlet flow device has an overflow escapement.

6. A lift station maintenance system, said system comprising in combination:
  A. a vertical housing having a lower port for sewage entry;
  B. a lift station maintenance device as recited in claim 1, contained within said vertical housing;
  C. an elongated tube surmounting said lift station device in fluid communication with said central opening; and
  D. an electrical power source for said motor.

* * * * *